United States Patent
Hassan-Ali et al.

(10) Patent No.: US 7,280,542 B2
(45) Date of Patent: Oct. 9, 2007

(54) MULTICASTING SYSTEM AND METHOD FOR USE IN AN ACCESS NODE'S ATM SWITCH FABRIC

(75) Inventors: Mudhafar Hassan-Ali, Rohner Park, CA (US); Jeff Mendelson, Petaluma, CA (US); Annie Rastello, Rohnert Park, CA (US); Li-Sheng Chen, Petaluma, CA (US); Radimir Shilshtut, Rohnert Park, CA (US); Sina Soltani, Rohnert Park, CA (US); Francisco Moreno, Petaluma, CA (US)

(73) Assignee: Alcatel Lucent, Paris (FR)

( * ) Notice: Subject to any disclaimer, the term of this patent is extended or adjusted under 35 U.S.C. 154(b) by 1067 days.

(21) Appl. No.: 10/280,959

(22) Filed: Oct. 25, 2002

(65) Prior Publication Data

US 2004/0081156 A1  Apr. 29, 2004

(51) Int. Cl.
*H04L 12/56* (2006.01)
(52) U.S. Cl. .................. 370/395.1; 370/390; 370/412; 370/432
(58) Field of Classification Search ............. 370/395.1, 370/395.72, 390, 432, 412
See application file for complete search history.

(56) References Cited

U.S. PATENT DOCUMENTS

| | | |
|---|---|---|
| 4,878,048 A | 10/1989 | Gottesman et al. |
| 5,119,370 A | 6/1992 | Terry |
| 5,237,565 A | 8/1993 | Henrion et al. |
| 5,287,355 A | 2/1994 | Takahashi et al. |
| 5,383,180 A | 1/1995 | Kartalopoulos |
| 5,396,622 A | 3/1995 | Lee |

(Continued)

FOREIGN PATENT DOCUMENTS

EP        0 713 347 A2     3/1999

(Continued)

OTHER PUBLICATIONS

Giroux, Natalie and Gantl, Sudhakar, "Queuing and Scheduling", Quality of Service in ATM Networks: State of the Art Traffic Management, Chapter 5, pates 85-121.

(Continued)

*Primary Examiner*—Derrick W. Ferris
(74) *Attorney, Agent, or Firm*—Shreen Danamraj; Bobby D. Slaton

(57) ABSTRACT

A multicast scheme for scheduling a root flow in an ATM environment. A buffer system including an index memory is operable to contain a plurality of leaf flow index values associated with the leaves and a root flow index associated with the root flow from the ingress interface. A pointer memory is provided wherein a plurality of circularly-linked pointers are indexed from the leaf and root flows. A cell memory is provided with a plurality of cell memory locations to which the linked pointers point. Root flow cells in the ATM environment are stored in the cell memory locations based on the root flow index. When a particular flow becomes eligible for scheduling, a copy of a root cell is obtained for emission, the root cell being located in a cell memory location that is pointed to by a linked pointer, to which the particular leaf flow is indexed.

27 Claims, 7 Drawing Sheets

U.S. PATENT DOCUMENTS

| | | | |
|---|---|---|---|
| 5,526,344 A | 6/1996 | Langdon et al. | |
| 5,580,399 A | 12/1996 | Ganmukhi et al. | |
| 5,734,656 A | 3/1998 | Prince et al. | |
| 5,784,371 A | 7/1998 | Iwai | |
| 5,850,399 A | 12/1998 | Ganmukhi et al. | |
| 5,859,835 A | 1/1999 | Varma et al. | |
| 5,862,136 A | 1/1999 | Irwin | |
| 5,875,190 A | 2/1999 | Law | |
| 5,878,042 A | 3/1999 | Fraas et al. | |
| 5,889,773 A | 3/1999 | Stevenson, III | |
| 5,896,382 A | 4/1999 | Davis et al. | |
| 5,901,024 A | 5/1999 | Deschaine et al. | |
| 5,926,579 A | 7/1999 | Baras | |
| 5,953,338 A | 9/1999 | Ma | |
| 5,991,298 A * | 11/1999 | Hunt et al. | 370/390 |
| 6,064,650 A | 5/2000 | Kappler et al. | |
| 6,064,651 A | 5/2000 | Rogers et al. | |
| 6,081,507 A | 6/2000 | Chao et al. | |
| 6,128,295 A | 10/2000 | Larsson et al. | |
| 6,353,593 B1 | 3/2002 | Chen | |
| 6,370,159 B1 | 4/2002 | Eidson | |
| 6,411,957 B1 | 6/2002 | Dijkstra | |
| 6,415,325 B1 | 7/2002 | Morrien | |
| 6,434,140 B1 | 8/2002 | Barany et al. | |
| 6,480,487 B1 | 11/2002 | Wegleitner et al. | |
| 6,480,511 B1 | 11/2002 | Petty | |
| 6,574,217 B1 | 6/2003 | Lewis et al. | |
| 6,728,239 B1 | 4/2004 | Kung et al. | |
| 6,795,886 B1 * | 9/2004 | Nguyen | 710/310 |
| 6,822,958 B1 * | 11/2004 | Branth et al. | 370/390 |
| 6,904,060 B2 | 6/2005 | Nelson et al. | |
| 6,914,898 B2 | 7/2005 | Kaczmarczyk et al. | |
| 6,950,441 B1 | 9/2005 | Sasagawa et al. | |

FOREIGN PATENT DOCUMENTS

| | | |
|---|---|---|
| EP | 0 901 302 A2 | 3/1999 |
| EP | 0 961 512 A1 | 12/1999 |
| EP | 1 093 266 A2 | 4/2001 |
| EP | 1 111 855 A2 | 6/2001 |
| EP | 1 111 858 A2 | 6/2001 |
| EP | 1111858 A2 | 6/2001 |
| EP | 0 522 773 A2 | 5/2004 |
| WO | 97/04558 | 2/1997 |
| WO | WO97/04558 | 2/1997 |
| WO | 00/11880 A2 | 3/2000 |
| WO | 01/86884 A1 | 11/2001 |

OTHER PUBLICATIONS

Kaufman, Jill et al "ATM Forum Education Corner", at http://www.atmforum.com/pages/library/53bytes/backissues/others/53bytes-0994-4.html.

Traffic Management Specification, The ATM Forum Technical Committee, Version 4.1, AF-TM-0121.000, Mar. 1999.

Knuth, D.E.; "The Art of Computer Programming, vol. 3: Sorting and Searching"; 1973; Addison-Wesley Publishing Company, Inc.; USA.

* cited by examiner

MULTICASTING SYSTEM AND METHOD FOR USE IN AN ACCESS NODE'S ATM SWITCH FABRIC

CROSS-REFERENCE TO RELATED APPLICATION(S)

This application discloses subject matter related to the subject matter disclosed in the following commonly owned co-pending U.S. patent applications: (i) "Stackplane Architecture," filed Dec. 22, 1999, application Ser. No. 09/469,897, in the names of James W. Dove et al.; (ii) "Scalable Architecture For An Access Node," filed Jun. 27, 2002, application Ser. No. 10/184,386, in the name(s) of Eric Friedrichs et at.; (iii) "Integrated Gateway Functionality In An Access Network Element," filed Nov. 2, 2001, application Ser. No. 10/052,846, in the names of Thornton Collins et al.; (iv) "System And Method For Implementing GFR Service In An Access Node's ATM Switch Fabric," filed even date herewith, application Ser. No. 10/280,700, in the names of Mudhafar Hassan-Ali et al.; (v) "Virtual Group Connection Scheme For ATM Architecture In An Access Node," filed even date herewith, application Ser. No. 10/280,604, in the names of Mudhafar Hassan-Ali et at; (vi) "Calendar Heap System And Method For Efficient Sorting," filed even date herewith, application Ser. No. 10/281,003, in the names of Mudhafar Hassan-Ali et al.; (vii) "Hierarchical Scheduler Architecture For Use With An Access Node," filed even date herewith, application Ser. No. 10/280,894, in the names of Mudhafar Hassan-Ali et al., which are hereby incorporated by reference herein for all purposes.

BACKGROUND OF THE INVENTION

1. Technical Field of the Invention

The present invention generally relates to telecommunications. More particularly, and not by way of any limitation, the present invention is directed to a system and method for implementing multicast methodology in an access node's Asynchronous Transfer Mode (ATM) switching fabric.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. Liberalized governmental activity with respect to telecommunications is another factor, which is fostering broader competition through deregulation in local area markets everywhere. The third and final factor is congestion in the Public Switched Telephone Network (PSTN), originally designed and developed for voice-only traffic.

There have been several important advances in telecommunications technology that enable high rates of throughput in carrier networks' backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access have been beset by the limitations of the existing twisted-pair copper cable infrastructure (i.e., access network) provided between a carrier's central office (CO) and a subscriber's remote site, typically referred to as the local loop. In the telecommunications art, these limitations are sometimes collectively described as the "last-mile" problem.

Current access network solutions that attempt to avoid the bottleneck created by the last-mile problem involve the use of fiber optic technology in the local loop also. As with the high-speed carrier networks, the fiber-based local loop infrastructure is typically architected using SONET as the physical layer technology. With recent developments in optical components and related opto-electronics, in addition to improvements in network design, broadband access is now becoming commonplace.

Moreover, coupled with the phenomenal growth in popularity of the Internet, there has been a tremendous interest in using packet-switched network (PSN) infrastructures (e.g., those based on Internet Protocol (IP) addressing) as a replacement for the existing circuit-switched network (CSN) infrastructures used in today's telecommunications networks. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Accordingly, a new breed of service-centric networks (distinct from the existing voice-centric and data-centric networks) are being explored for implementation on what is known as the next-generation network (NGN) infrastructure, where integrated voice/data/video applications may be provisioned using a packet transport mechanism over a PSN in an end-to-end transmission path. As alluded to hereinabove, it is believed that using a packet network infrastructure in access networks provides higher transmission efficiency, lower operation and maintenance costs, and a unified access.

Traditional access systems allow accessing a digital local voice switch, such as a Class 5 switch, by extending a plurality of metallic loops and aggregating them in a bundle for efficiently transmitting the time-division multiplexed (TDM) voice traffic. Typically, such access networks are architected using one or more access nodes in a variety of configurations, e.g., point-to-point chains, rings, etc., wherein an access node may itself comprise several channel banks that provide line interfaces servicing a large number of subscribers.

In order to afford increased levels of functionality and service provisioning, however, access networks of today are being required to support advanced transport mechanisms such as SONET for the internal architecture of the nodes as well. In such nodes, ATM is used for carrying most of the subscriber traffic, except the traditional TDM services such as T1 and TDM-DS3 services. Accordingly, both TDM as well as ATM switching fabrics need to be supported in the access node design.

The ATM Forum provides a set of specifications governing the various aspects of an ATM switching fabric, including the types of connections such as, e.g., Virtual Channel Connections and Virtual Path Connections, and their topology, e.g., point-to-point (unicast) connections and point-to-multipoint (multicast) connections. As is well known, where multicasting is supported in an environment, a single source of traffic (i.e., a root) emits cells or packets to a number of destinations (i.e., leaves) that receive the replicated traffic. For robust implementation, it is necessary that a leaf flow not interfere with or otherwise impede the transmission to the other leaves. Also, queues required to support multicast flows should be efficient in memory utilization.

Whereas several techniques exist for implementing multicast flows in an ATM environment, they are beset with certain deficiencies. First, the current multicast solutions are memory intensive because each leaf's queue is implemented using a separate cell buffer. Further, the performance of the leaves is coupled, in that a single leaf node can hold up the multicasting process when the node becomes nonfunctional for some reason.

SUMMARY OF THE INVENTION

Accordingly, the present invention provides a multicast scheme for scheduling a root flow in an ATM environment, e.g., a switch fabric, wherein a plurality of egress interfaces are serviced by a corresponding number of leaf flows with minimal buffer requirements and enhanced segregation between leaf flows. A buffer system including an index memory structure is operable to contain a plurality of leaf flow index values associated with the leaf flows and a root flow index associated with the root flow from the ingress interface. A pointer memory structure is provided wherein a plurality of circularly-linked pointers are indexed from the leaf and root flows. A cell memory structure is provided with a plurality of cell memory locations to which the linked pointers point. Root flow cells received in the ATM environment are stored in the cell memory locations based on the root flow index. When a particular flow becomes eligible for scheduling, a copy of a root cell is obtained for emission, the root cell being located in a cell memory location that is pointed to by a linked pointer, to which the particular leaf flow is indexed.

In one aspect, the present invention is directed to a multicast method for directing a root flow in an ATM environment to a plurality of egress interfaces using a corresponding number of leaf flows. A circularly-linked pointer list is initialized in a pointer memory buffer, wherein a plurality of linked pointers point to a corresponding number of cell memory locations in a cell memory space. Upon receiving root flow cells in the ATM environment, the cells are stored in the cell memory locations based on a root flow index associated with the root flow. The root flow index is initialized to a particular pointer of the linked pointer list for storing a head root flow cell and is updated through the linked pointers upon arrival of additional root flow cells. A plurality of leaf flow index values are initialized in an index memory space, wherein each index value corresponds to a leaf flow and is initially indexed to the particular pointer pointing to a cell memory location containing the head root flow cell. When a particular leaf flow becomes eligible for scheduling, a copy of the head root cell is obtained for emission to an egress interface associated with the particular leaf flow. Thereafter, its leaf flow index value is updated to refer to the next one of the linked pointer list. Upon scheduling a particular root flow cell for each of the leaf flows, a new root flow cell may be written in that root flow cell's location using the root flow index.

In another aspect, the present invention is directed to a multicast system for directing a root flow in an ATM environment, e.g., a switch fabric disposed in an access node, to a plurality of egress interfaces using a corresponding number of leaf flows, wherein various buffer structures and associated scheduler arrangement are provided for accomplishing the aforesaid operations.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

An embodiment of the present invention will now be set forth in light of the teachings provided in the commonly owned co-pending U.S. patent application entitled "Hierarchical Scheduler Architecture For Use With An Access Node," filed even date herewith, application Ser. No. 10/280,894, in the names of Mudhafar Hassan-Ali et al., (hereinafter, the Hierarchical Scheduler Architecture application), incorporated by reference hereinabove. As described in detail in that application, a telecommunications node disposed in an access network may be comprised of a scalable architecture wherein both TDM and ATM switching fabrics are provided in order to support increased levels of functionality. Additionally, the scheduling functionality associated with the ATM switching fabric can be partitioned on a per-service category basis (i.e., service planes) and across a plurality of hierarchical data pipe aggregations (i.e., subport, bus level, shelf level, stackplane level, and pipe level, et cetera, treated as aggregation layers) as may be necessitated by the scalable hardware architecture so that traffic contract compliance as well as requisite connection isolation and fair bandwidth allocation can be effectively achieved in the ATM switching fabric of an access network node.

Figure 1:
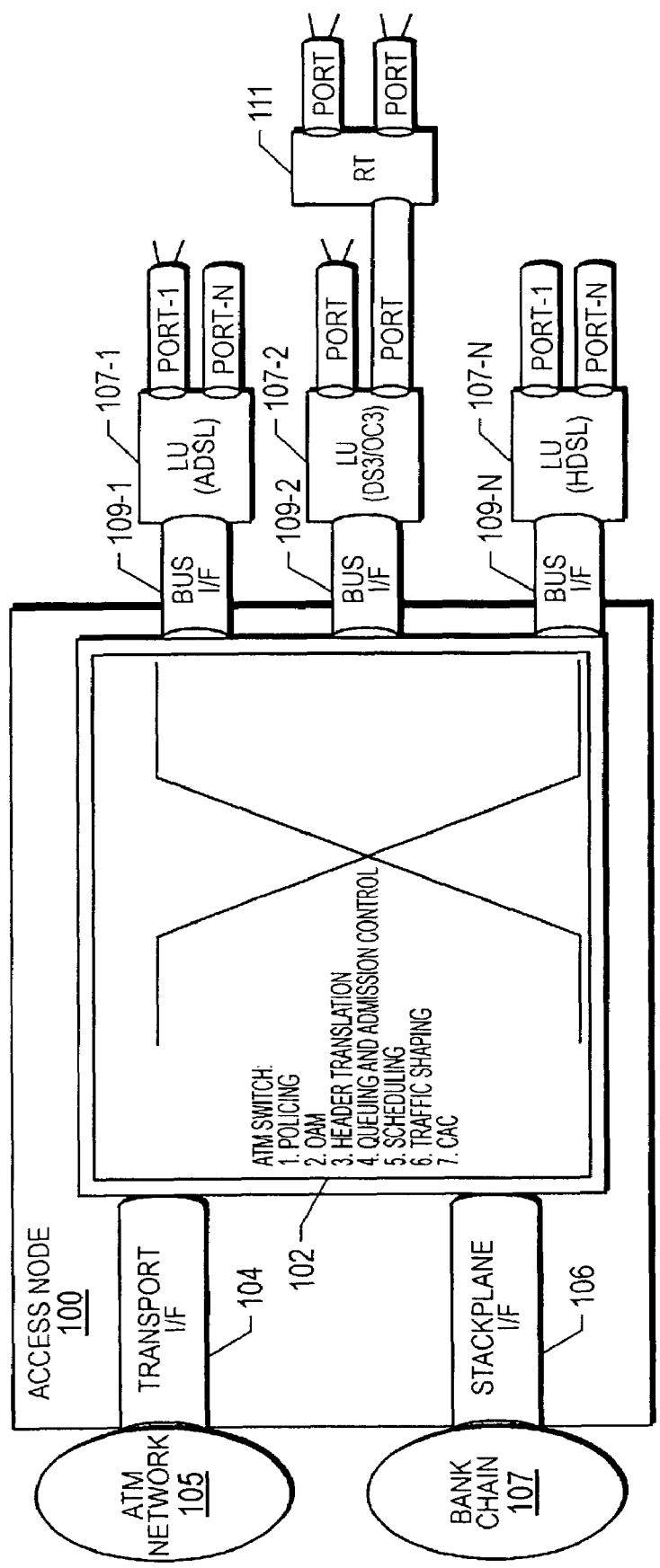
FIG. 1 depicts an exemplary access node having an ATM switching fabric wherein the teachings of the present invention may be advantageously practiced.

Referring now to the drawings of the present patent application, wherein like or similar elements are designated with identical reference numerals throughout the several views thereof and the various elements depicted are not necessarily drawn to scale, and referring in particular to FIG. 1, depicted therein is an exemplary access node 100 having a high level functional representation of an ATM switch fabric 102, wherein the teachings of the present invention may be advantageously practiced. As explained in the Hierarchical Scheduler Architecture application referenced above, the overall functionality of the switch fabric 102 includes: policing; operation, administration and maintenance (OAM); header translation; queuing; scheduling and traffic shaping; and Connection Admission Control (CAC). As can be readily seen, traffic to the fabric 102 is provided via a number of interfaces. A transport interface 104 is operable to connect the node's fabric to a backbone network, e.g., ATM network 105. A stackplane interface 106 is operable to carry the traffic from a secondary shelf bank chain 107 (e.g., comprising channel banks 506-1 through 506-4 and channel banks 508-1 through 508-4 shown in FIG. 5 of the Hierarchical Scheduler Architecture application) to the fabric 102. A plurality of subscriber interfaces via line units (LUs) 107-1 through 107-N exemplify various service sources such as xDSL, T1, ISDN, DS-3/OC-3, etc., that can interface with the fabric 102 through appropriate bus level ports 109-1 through 109-N. One of the ports of a line unit may be coupled to an RT 111 as part of an access network (not shown in this FIG.).

Two types of ATM connections may be defined with respect to the internal ATM traffic: Virtual Channel Connections (VCCs) and Virtual Path Connections (VPCs). A VCC is typically the lowest flow granularity an ATM connection may have, which is identified by a unique value comprising a pair of identifiers, i.e., Virtual Channel Identifier (VCI) and Virtual Path Identifier (VPI), on a physical interface. A VPC, on the other hand, is defined as a group of all flows that share the same VPI value and a common pool of resources (e.g., bandwidth, et cetera). Thus, it can be seen that a VP is a bundling of VCs which can simplify the management of the connections in an ATM environment by reducing the number of elements to manage, wherein each connection is identified by its unique VPI/VCI pair.

From the standpoint of topology, a VCC or a VPC can be either of the following two types: (i) point-to-point connections, wherein bi-directional connections are established and the sources in each direction may be different and (ii) point-to-multipoint connections, which typically utilize a plurality of uni-directional connections for multicast (MC) transport across the fabric. As will be seen in greater detail hereinbelow, the present invention provides an advantageous scheme for scheduling MC flows by utilizing a minimal amount of memory while decoupling the performance of the leaf flows from one another.

In addition, another level of ATM connection hierarchy, called a Virtual Group Connection or VGC, may also be implemented in conjunction with the teachings of the present invention. Additional details regarding the VGC implementation are provided in the following the commonly owned co-pending U.S. patent application entitled "Virtual Group Connection Scheme For ATM Architecture In An Access Node," filed even date herewith, application Ser. No. 10/280,604, in the names of Mudhafar Hassan-Ali et al., incorporated by reference hereinabove.

Ingress traffic management with respect to the flows presented to the switch fabric 102 (whose functionality may be embodied as an ATM cross-connect fabric (XCF) card) accordingly encompasses three stages in general: policing, VC queue/buffer allocation and shaping/scheduling. In one implementation, hardware relating to these stages may be integrated within the XCF card. The primary function of a policer is to ensure that the received cells are compliant with respect to applicable connection descriptors. If not, the incoming cells may be dropped or marked (i.e., tagged) by clearing/setting a Cell Loss Priority (CLP) field in their header portion. In general, the policing functionality is implemented by utilizing well known algorithms described in ITU-T 1.371 and ATM Forum ATMF-TM-121 standards. Essentially, these algorithms (typically categorized as a Generic Cell Rate Algorithm or GCRA) use what is known as a credit counter called bucket and the credit known as tokens. If there is enough credit (i.e., tokens) in the counter (i.e., bucket) upon receiving a cell, then the cell is admitted; otherwise, the cell is tagged as a lower priority cell or discarded. Furthermore, as explained in the Hierarchical Scheduler Architecture application, the GCRA-based algorithms can be implemented in what is known as a Leaky Bucket Module (LBM) for both traffic policing and traffic shaping (i.e., scheduling) purposes with respect to several ATM traffic Classes (categorized based on a Class of Service (CoS) that is defined by such factors as the time sensitivity, peak and sustained bandwidth guarantees, burstiness and delivery guarantees).

The hierarchical scheduling functionality is implemented by means of a Priority Queue Module (PQM) (not shown in this FIG.), wherein each layer performs the scheduling function for an entry, which can be one of the following based on the flow aggregation: subport, bus, port, and pipe. Essentially, when a cell of new flow is received by the fabric, this data flow is represented by one entry in the scheduler as follows. A Flow ID (i.e., FID) is received from the LBM and, based on the COS/QOS, the data of the flow (i.e., FID and timestamp or TS) are stored in the applicable layer-1 data structure. From all competing subports in layer-1 (e.g., different flows from a line unit), only one with the minimum TS is selected by the layer arbiter, which is then forwarded to the next layer's arbitration, i.e., layer-2 arbitration. The layer-2 data structure accordingly contains "winner FID/TS" data from different subports. Again, only one entry having the minimum TS is selected to be forwarded to layer-3. The scenario is thus successively repeated for additional aggregation layers, which ultimately results in a winner nominee (i.e., the FID/TS data of the winning cell) for each service priority category. Further, as pointed out in the Hierarchical Scheduler Architecture application, the layer-based arbitration is performed for each service category plane so as to result in a winner nominee for each plane, whereupon a CoS-aware timestamp-based arbiter selects a final winner by arbitrating among nominees from each service plane.

Figure 2:
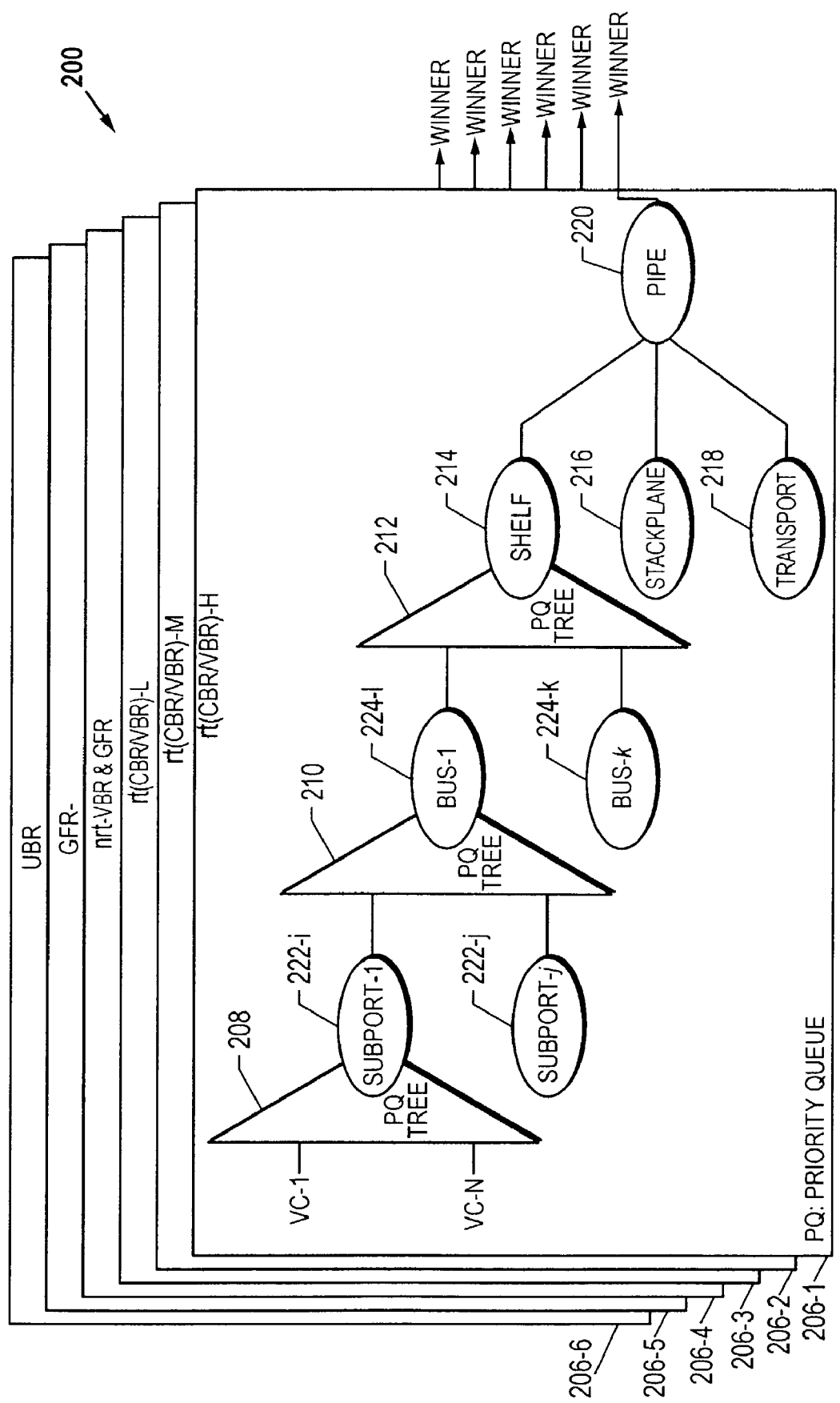
FIG. 2 depicts an embodiment of a multi-layer, multi-plane scheduler operable to implement scheduling functionality for serving multicast flows in the ATM switching fabric shown in FIG. 1.

It should therefore be recognized that arbitration at each layer involves managing the PQ structures associated therewith for selecting a winner for that layer. In general, the PQ structures are implemented in a tree fashion, wherein the data nodes (representing, e.g., the TS/FID of the admitted cell or the cell selected from the lower layer) are arranged in accordance with certain insertion/deletion rules. FIG. 2 depicts an embodiment of a multi-layer, multi-plane scheduler 200 operable to implement scheduling functionality for serving MC flows in the ATM switching fabric shown in FIG. 1. Each of the PQ entities of the scheduler 200 at each aggregation layer is shown as a tree structure, resulting in an overall nested tree arrangement for each service plane. The following table sets forth various exemplary service Classes and associated parametric information:

TABLE I

| Class of Service | Applications | Parameters |
|---|---|---|
| Real time Constant Bit Rate (CBR), real time Variable Bit Rate (rt-VBR) | Voice (single channel or trunk), VBR video, games | Peak Cell Rate (PCR), Cell Delay Variance Tolerance (CDVT) |
| Non-real time Variable Bit Rate (nrt-VBR) | Data, multimedia, email, video streaming | PCR, CDVT, Sustainable Cell Rate (SCR), Maximum Burst Size (MBS) |
| Guaranteed Frame Rate (GFR) | Premium Data, Web browsing, Internet | PCR, CDVT, MBS, Maximum Cell Rate (MCR), Maximum Frame Size (MFS) |

TABLE I-continued

| Class of Service | Applications | Parameters |
| --- | --- | --- |
| Best effort (Unspecified Bit Rate or UBR) | Inexpensive data, Web browsing and Internet | PCR, CDVT |

Additional details relating to the parametric data and QoS levels can be found in the Hierarchical Scheduler Architecture application. Continuing with FIG. 2, reference numerals 206-1 through 206-6 refer to the following service planes: rt[CBR/VBR]—HIGH plane, rt[CBR/VBR]—MEDIUM plane, rt[CBR/VBR]—LOW plane, nrt-VBR and GFR plane, GFR-plane, and UBR (i.e., Best Effort) plane, respectively. Reference numeral 208 refers to the PQ tree corresponding to a subport arbiter 1305-i, wherein the PQ tree is formed based on the VC connections supported by the corresponding subport. Essentially, each subport of the scheduler uses (or builds) a PQ which is a data structure that stores all active FIDs (i.e., the VC queue associated with the FID has at least one cell in it). The winners from all the subport arbiters (e.g., subport arbiters 222-i and 222-j) are forwarded to populate the next-level PQ tree structure 210 associated with a bus level arbiter 224-l. Likewise, the bus level arbiters 224-l and 224-k forward the respective selections to a shelf level PQ structure 212. A shelf level arbiter 214, a stackplane interface 216, a transport level interface 218 forward their selections to a pipe level arbiter 220 that selects a winner nominee for a particular service plane.

A number of data structures can be provided to implement the tree-based PQs used in the context of hierarchical scheduling as set forth in the present patent application. In one exemplary implementation of the present invention, the PQ entities may be embodied as a heap structure. Whereas the heap implementation is generally optimal in memory utilization, it suffers from algorithmic complexity that can limit the throughput in a high-speed design. In another implementation, accordingly, the layer-specific PQ entities are embodied as a hybrid "calendar heap" structure, which is described in additional detail in the commonly owned co-pending U.S. patent application entitled "Calendar Heap System And Method For Efficient Sorting," filed even date herewith, application Ser. No. 10/281,033, in the names of Mudhafar Hassan-Ali et al., incorporated by reference hereinabove.

Figure 3:
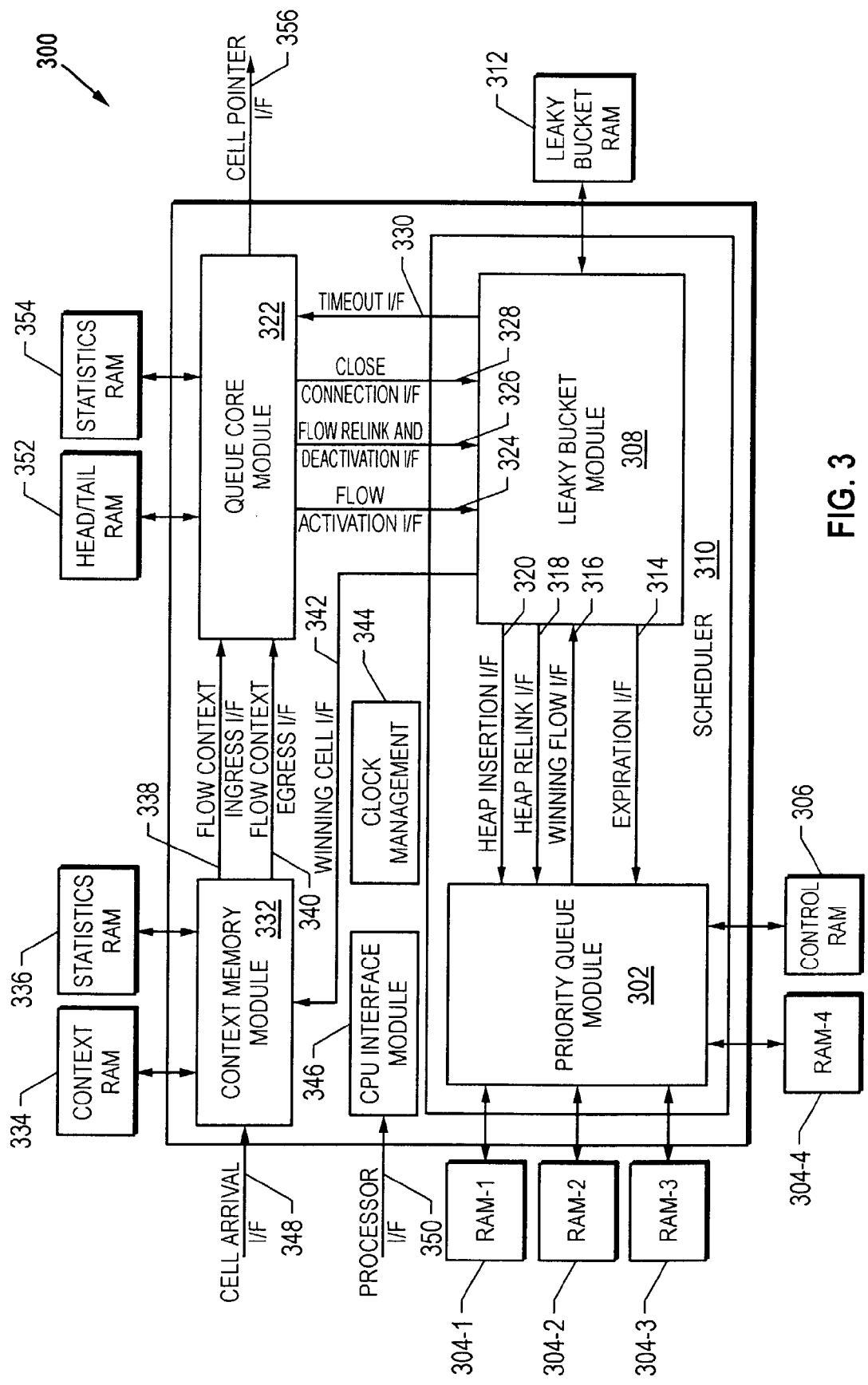
FIG. 3 depicts a high level functional block diagram illustrating a Leaky Bucket Module and a Priority Queue Module of the scheduler for implementing the teachings of the present invention.

Referring now to FIG. 3, depicted therein is a high level functional block diagram illustrating a switch fabric card 300 that includes a scheduler block 310 for implementing a multicast flow scheduling methodology in an access node in accordance with the teachings of the present invention. The scheduler block 310 is comprised of a PQM 302 and an LBM 308 having a number of interfaces therebetween to effectuate message/data communication relating to scheduler operations. These interfaces comprise a time expiration interface 314, a winning flow interface 316, a heap/flow relink interface 318, and a heap/flow insertion interface 320. The PQM block 302 is further interfaced with a plurality of memory blocks 3041 through 304-4 for storing the various PQ data structures relating to the hierarchical scheduler architecture described above. A control memory 306 coupled to the PQM block 302 is operable to store control program code relating to the PQM's operations.

The LBM block 308 is also interfaced with one or several memory blocks, e.g., memory 312, operable to store information relating to the policing and shaping algorithmic processes effectuated by the LBM. In one implementation, the LBM is operable to effectuate a Leaky Bucket Calculator as a state machine that determines the eligibility of a cell according to the traffic contract and the history of the connection it belongs to. When used for policing, the state machine determines the compliance of the incoming cells, whereas when used in shaping, it determines the time when the cell is eligible for service. Depending on the service Class, one or more specific algorithmic processes with particular parametrics (i.e., traffic descriptors, Leaky Bucket parameters (Theoretical Arrival Time or TAT, TS values, cell arrival times, etc.) are provided in order to effectuate the LBM's policing and shaping operations. As will be described in detail below, the GFR service of the present invention is implemented using two separate algorithmic LB processes, each with a separate set of parametrics, that are operable to regulate a guaranteed flow portion and a non-guaranteed flow portion, respectively.

The LBM block 308 is also interfaced to a Context Memory Module (CMM) 332 and a Queue Core Module (QCM) 322 in order to achieve its overall functionality of maintaining the Leaky Bucket information for all the flows serviced by the ATM fabric, including MC flows wherein a root flow is directed to a plurality of egress ports, or leaves. A cell arrival interface 348 associated with the CMM block 332 operates as the entry point for incoming cells. A context memory 334 associated with the CMM block 332 is operable to store flow-based information such as QoS, FID, Leaky Bucket parameters, Destination Path Tag (DPT) information, etc. Also, a statistics memory block 336 may be provided for collecting performance monitoring data relative to the connections served by the ATM switch fabric card 300. Ingress flow context information and egress flow context information is provided to the QCM block 322 via interfaces 338 and 340, respectively. A head/tail pointer memory 352 and a statistics memory 354 are coupled to the QCM block 322. A cell pointer interface 356 associated therewith is used for pointing to cells eligible for service based on scheduling operations. The functionality of the head/tail memory and cell pointers will be described in additional detail below within the context of a multicast flow.

Interfacing between the QCM block 322 and LBM block 308 includes the following: a Flow Activation interface 324, a Flow Relink and Deactivation interface 326, a Close Connection interface 328 and a Timeout interface 330. A winning cell interface 342 provided between the LBM block 308 and CMM block 332 is operable to transmit information regarding the winner cells. Further, a clock management block 344 and a processor interface module 346 having a processor interface 350 are also provided.

In view of the various structural blocks described above, the overall functionality of the LBM block 308 includes the following:

Flow Activation: When a cell arrives and the cell buffer relative to its FID was previously empty, a Flow Activation message is sent by the QCM to the LBM. This interface contains the information found in the context memory relative to the flow.

Winning Flow and Flow Relink/Deactivation: When a flow is chosen as the winner by the PQM, it is deleted from the different heaps it belongs (depending on the aggregation layers, for instance). If there are cells remaining in the cell buffer of that specific flow, then the LBM recalculates the TS values and relinks the flow in the PQ data structures. If there is no cell remaining, the LBM calculates the TS values for that flow and stores them in the Leaky Bucket memory until another cell arrives for that flow.

Close Connection: If the CAC suppresses a flow, the cell buffer is flushed and the FID may be reused for another connection. In order to prevent use of the old parameters for the new connection, the LBM has to be informed that this flow is no longer valid.

Time Expiration/Timeout: The Leaky Bucket memory is checked, preferably periodically, in order to prevent the storage of expired times.

Figure 4:
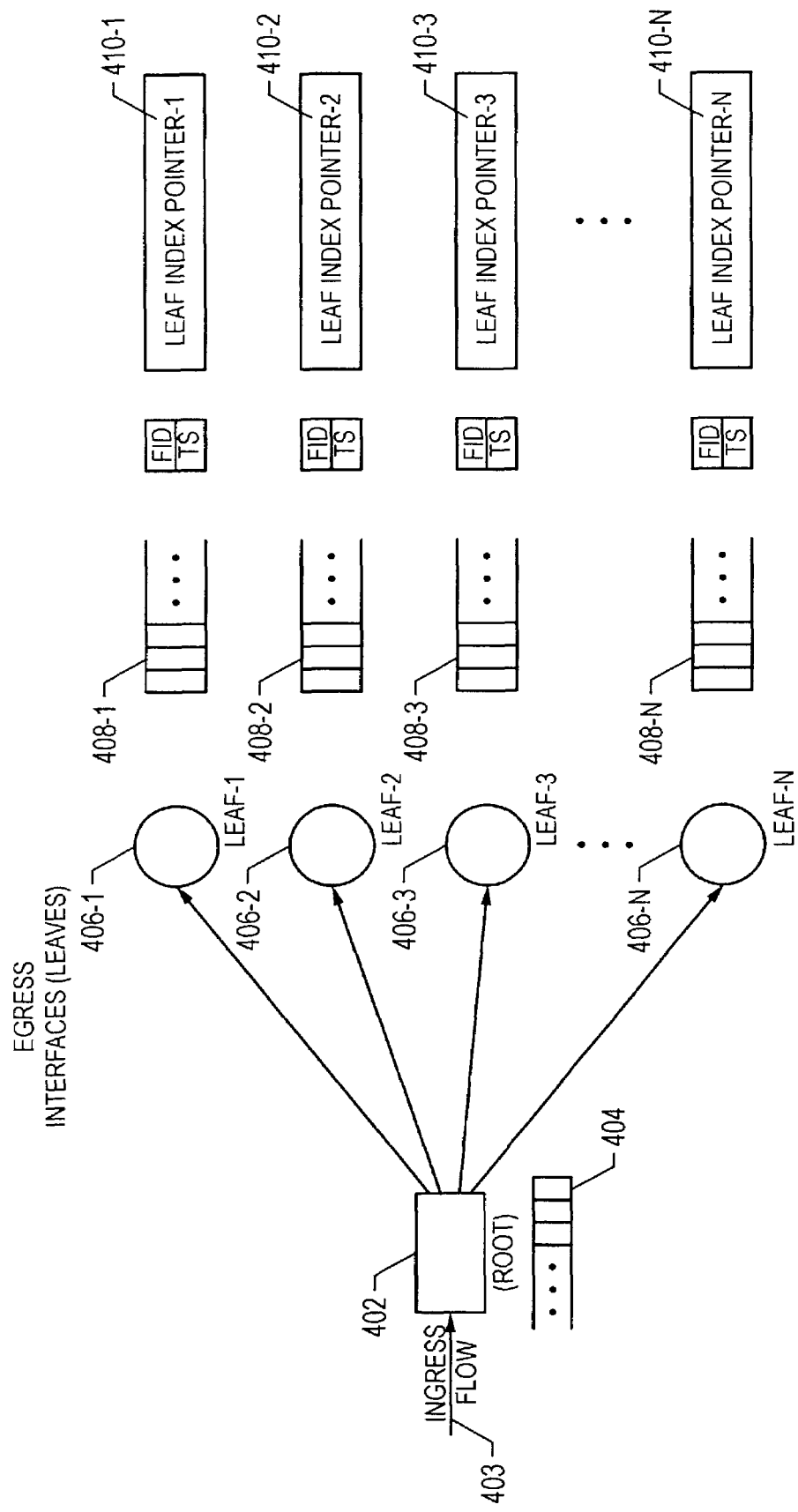
FIG. 4 depicts an exemplary multicast flow where a root flow is transmitted to a plurality of egress interfaces (i.e., leaves) in accordance with the teachings of the present invention.

FIG. 4 depicts an exemplary multicast (MC) flow arrangement where a root flow entering an ATM environment, e.g., the ATM switch fabric of the access node 100 shown in FIG. 1, is transmitted to a plurality of egress interfaces using a corresponding number of leaf flows. In one embodiment, a scheduler such as the one described in the Hierarchical Scheduler Architecture application referenced above, may be used for implementing the necessary MC scheduling functionality. Reference numeral 402 refers to an interface that receives an ingress flow 403 (i.e., the root) that is to be scheduled for emission to N egress interfaces 406-1 through 406-N. As is well known in the art, the ingress flow 403 is referred to as the root flow and the MC flows emitted to the egress interfaces are referred to as the leaf flows. Reference numeral 404 refers to an illustrative queue associated with the root flow 403 having a plurality of root flow cells. Likewise, reference numerals 408-1 through 408-N refer to the N leaf flows associated with the corresponding number of egress interfaces (i.e., leaves). As will be described in greater detail below, each leaf flow will be initialized with an index pointer to pointer memory that implements a circular linked list of pointers for effecting the multicast functionality of the present invention. For instance, reference numerals 410-1 through 410-N refer to N leaf index pointer values associated with the N leaf flows. Furthermore, each leaf flow is provided with an FID and applicable LB parameters (e.g., TS), which are used by the scheduler for transmitting the replicated source traffic (i.e., root cells) to the associated egress interface when the leaf flow becomes eligible.

In the context of the QCM 322 described above in reference to FIG. 3, up to 256 MC roots can be established, with a maximum of 2K leaves per root. Once a root flow is established within the ATM fabric, MC leaves can be added or deleted from the MC session. Before a root flow is admitted into the QCM, however, a multicast session must be created, e.g., by software. In one implementation, the MC session creation process involves programming the context memory associated with the CMM 332 with context data for the root flow(s) and the leaves that belong to the respective MC sessions. Once the context memory is programmed, the leaves are activated within the scheduler module 310. Each leaf may be individually activated by the processor via the CPU interface module 346 by writing the required registers within the QCM block 322, which is operable to send a Leaf Activation message to the scheduler module 310 if there is no unicast activation required. Each MC root may also be programmed with a particular MC queue depth, which can be 256, 512, et cetera. As will be seen below, the MC queue depth relates to the number of pointers used in a circularly-linked buffer structure, which pointers point to a plurality of locations in a cell memory buffer used for storing the root flow cells, starting with the root flow's head cell. Also, an MC group value and MC bit may be set with respect to each MC root to indicate that the flow belongs to an MC session. It will be recognized that programming the MC leaves involves associating the leaves to the correct root. In one embodiment, this is accomplished by programming the MC leaves and MC root of the same session with the same MC group number. In addition, both the MC bit and MC Active bit are set to indicate that an MC leaf is active with respect to a root. The MC queue depth may be programmed for each of the leaves, but it is not required in general. If the MC Active bit is not set for a leaf and the scheduler emits a non-active leaf, then the QCM generates a Close Connection command for the leaf.

In one embodiment, the following operations may take place with respect to the QCM for an MC cell to be enqueued in the ATM fabric using the functional blocks shown in FIG. 3. During the context lookup, the FID is used for retrieving the flow context, which is sent to the QCM via the Flow Context Ingress Interface. Context data required to enqueue the MC flow are the MC bit, MC queue depth, and MC group number. The CMM is preferably operable to update the per-flow cell arrival count. The MC bit within the Flow Context Ingress Interfaces allows the QCM to recognize that the flow belongs to an MC flow. The QCM generates an address that indexes the correct MC table within the head/tail and pointer memories which will be described in detail below. The head/tail memory is indexed to retrieve the root sequence bit and current root flow index, which is the root write index pointer. Initially, the entire head/tail memory may be set to all zeros, thereby zeroing the current root index value for all MC sessions. In one implementation, the MC address for the pointer memory may be formed from the MC group number, current root index, and an offset value. Thus, it can be seen that the pointer memory is indexed with the generated MC pointer memory address, wherein root cell pointers are written into the pointer memory after verifying the validity of locations.

For a multicast cell to be de-queued from the ATM fabric, the following operations are performed with respect to the QCM block. The scheduler module issues a flow for emission via the winning cell interface 342. Using the winning flow's FID as an address, context is retrieved and sent to the QCM block via the Egress Flow Context interface 340. Context data required to de-queue an MC cell are the MC bit, MC Active bit, leaf sequence bit, MC queue depth, and the MC group number. The CMM block is operable to update the per-flow cell emission count, as the cells are scheduled for emission upon winning arbitration. The MC bit within the interface allows the QCM block to recognize that the flow belongs to an MC flow. If the MC Active bit=0, then a Close Connection command is issued to the scheduler; otherwise, the QCM block generates an address that indexes the current MC table within the head/tail and pointer memories. The QCM indexes the head/tail memory with the generated address and retrieves the root sequence bit and the current root index. This information is utilized in conjunction with the Egress Flow Context data in order to de-queue a cell from the MC queue. The QCM block then generates an address that indexes the appropriate MC table and emits a copy of the cell indexed by the leaf index pointer that operates as a read pointer. Similar to the root cell enqueuing process, the MC address for the pointer memory is formed with the MC group number, leaf index value and an offset value.

Upon emission of a cell's copy, the leaf index value and leaf sequence are updated as follows. When a leaf index equals the MC queue depth, the leaf has reached the end of the MC queue and, therefore, it needs to rollover. If the leaf index equals the current root index, the leaf read pointer equals the root cell write pointer, a root cell copy is not emitted for the leaf; rather, an Idle dell is emitted from the fabric. On the other hand, if the leaf index is not equal to the current root index, the leaf read pointer is not equal to the root cell write pointer, there is no out-of-sequence issue and the cell copy pointed to by the pointer (to which the leaf index is referenced) is emitted from the fabric and the leaf index is incremented by one.

Where a leaf and the root are out of sequence, a copy of the cell at the current root index is emitted and the leaf index is updated as follows. If the current root index equals the MC queue depth, then the leaf index is initialized to zero. On the other hand, if the current root index is not equal to the MC queue depth, the leaf index equals the current root index incremented by one.

In one implementation, a pointer is not returned to the free list of pointers upon emission of a copy of the cell, which is in the cell memory location addressed by the MC pointer. The leaf index value and the leaf sequence bit are both updated within the context memory per leaf FID.

Figure 5:
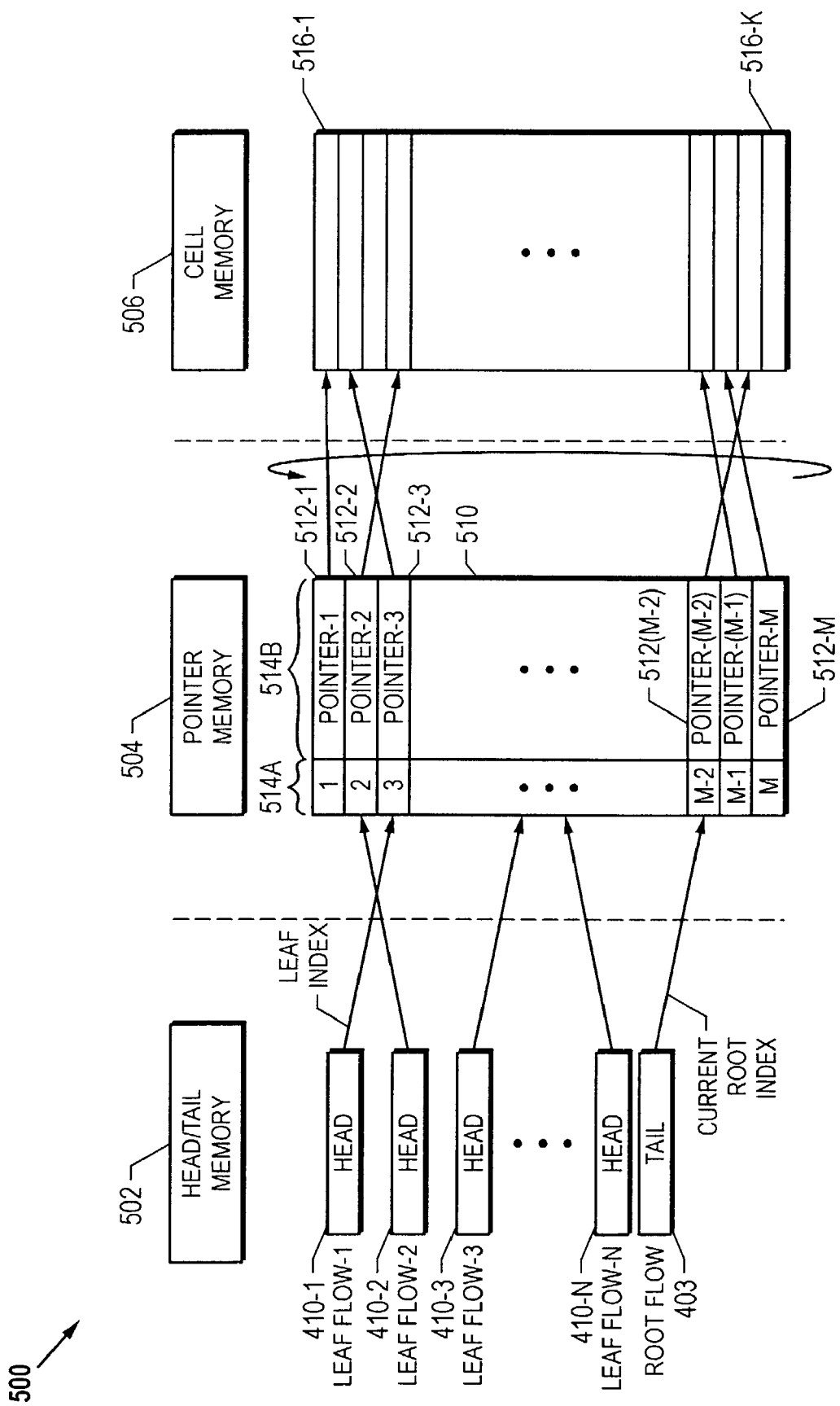
FIG. 5 depicts a memory embodiment for implementing the multicast queue buffer system of the present invention.

Referring now to FIG. 5, depicted therein is a memory embodiment 500 for implementing the MC queue buffer system of the present invention. The memory embodiment 500 is comprised of a head/tail memory 502, a pointer memory 504 and a cell memory 506 for effectuating the MC scheduling operations described in detail hereinabove. As set forth earlier, the leaf index values 410-1 through 410-N correspond to the N leaf flows associated with the root flow 403 and are initialized in the head/tail memory 502. The pointer memory 504 includes a circularly-linked pointer buffer 510 having a plurality of pointers 512-1 through 512-M, for supporting an MC queue of depth of M. The leaf index pointer locations contain the index values referenced to the linked MC pointers, and therefore operate as the leaf read pointers as explained above. Accordingly, the leaf index values can considered as indexing to the "heads" of the respective leaf flows' cell locations from which they obtain copies of cells upon winning arbitration. Likewise, the root index is referenced to a pointer location operating as the root cell write pointer, and may therefore be deemed as the "tail" of the MC queue to which cells get added as they arrive in the ATM switch environment.

The pointers 512-1 through 512-M may be linked in a circular fashion in any known or heretofore unknown technique. The linked buffer 510 includes an index portion 514A relating to the leaf and root flow index values, and a pointer location portion 514B containing pointers to the cell memory locations 516-1 through 516-K, which may be contiguous, distributed, or otherwise organized. The root cells are stored, or written to, the cell memory locations using the root index, starting with the head root cell and additional root flow cells as they are enqueued for the MC service. When a particular leaf flow becomes eligible for scheduling (e.g., based on its LB parameters such as TS), a copy of the head root cell is obtained for emission and the winning flow's leaf index is updated. When the flow wins arbitration again, a copy of the next cell in the cell memory is scheduled for emission.

Figure 6:
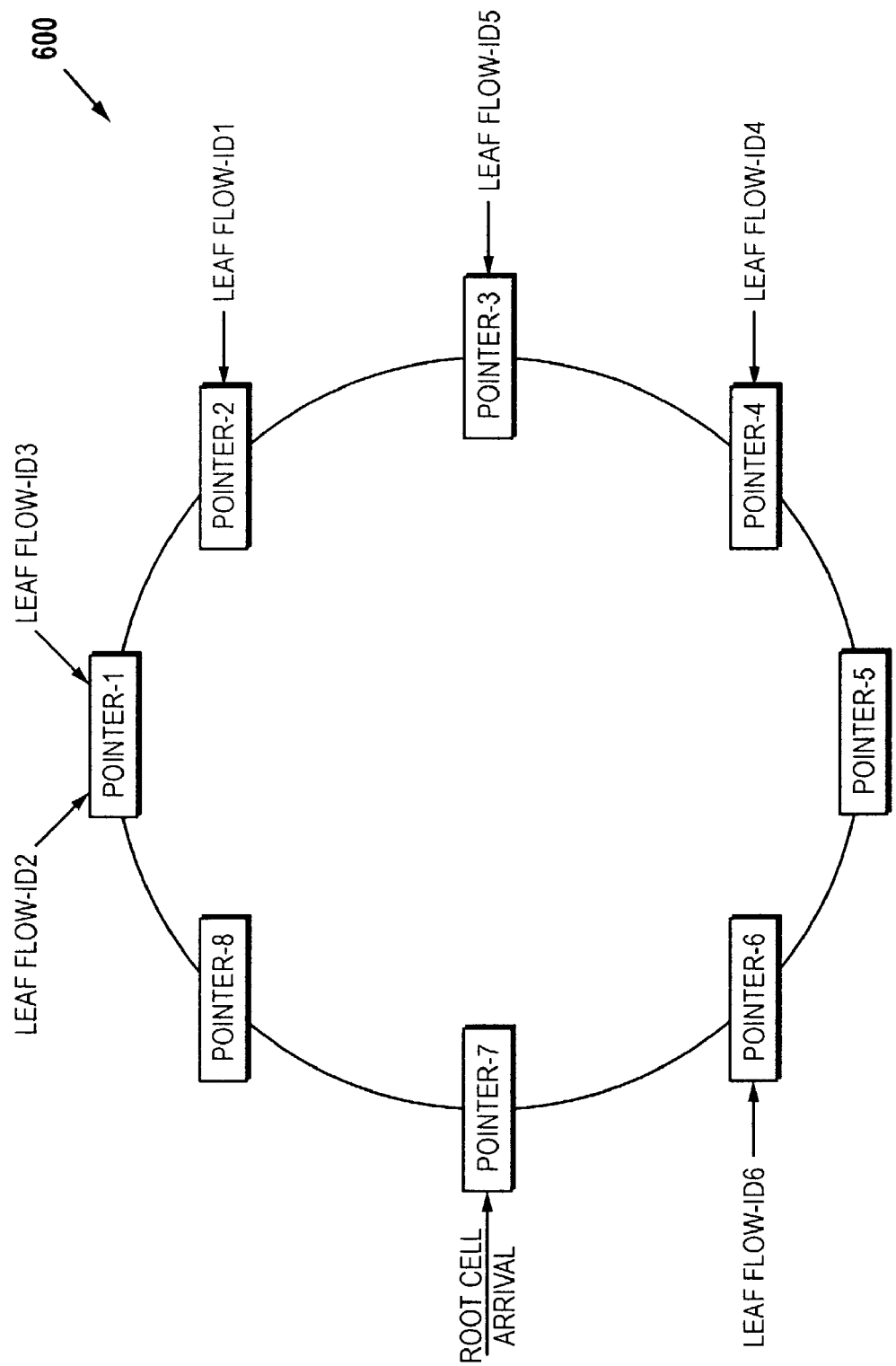
FIG. 6 depicts an embodiment of a circularly-linked pointer system for serving a multicast queue buffer having a depth of eight cell memory locations.

FIG. 6 depicts an embodiment of a circularly-linked pointer buffer system 600 for serving an MC queue having a depth of eight memory cell locations, each being pointed to by a linked pointer. Initially, the leaf flow index values and the root flow index are referenced to a common pointer. Upon arrival of a head root cell, the pointer indexed to by the root flow index points to the cell memory location where the head root cell can be stored. The root flow index is updated so that as additional root cells arrive, they are stored in appropriate cell locations. After storing eight root cells, the root flow index may stop at the current root flow index. The leaf flows, upon winning arbitrations based on their respective LB parametrics, start obtaining copies of the cells depending on the respective index values, which also get updated around the circular pointer buffer. As the arbitrations are performed independently for each time slot, the leaf flows may obtain copies of the root cells independently without interference from one another. Accordingly, once the MC session commences, the leaf flow index values can advance at variable rates and be indexed to different circular pointers. For instance, leaf flow-ID2 and leaf flow-ID3 are both indexed to pointer-1 and leaf flow-ID1, leaf flow-ID5, leaf flow-ID4 and leaf flow-ID6 are indexed to pointer-2, pointer-3, pointer-4 and pointer-6, respectively.

Figure 7:
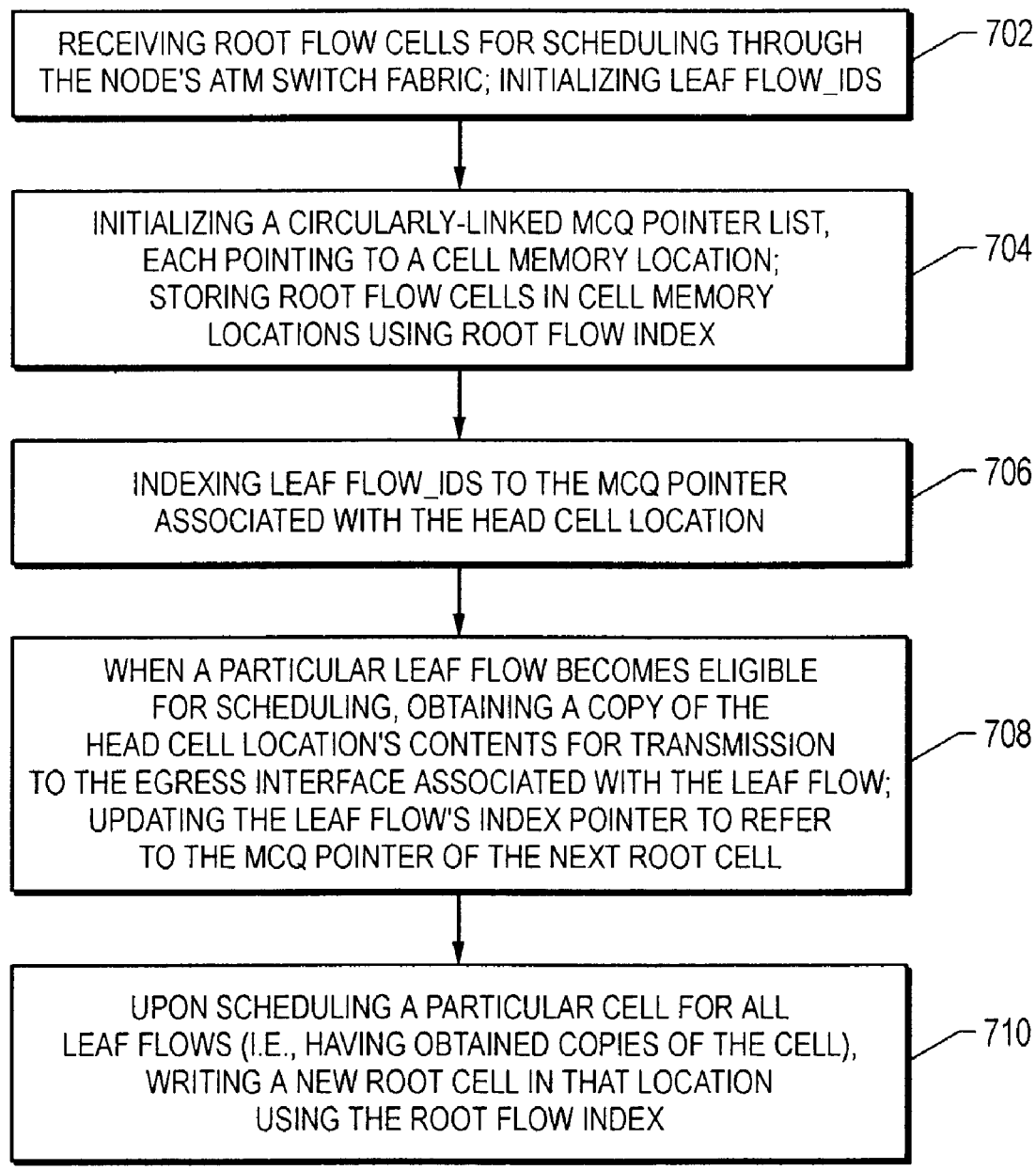
FIG. 7 is a flow chart of the operations involved in an embodiment of the multicasting methodology of the present invention.

FIG. 7 is a flow chart of the operations involved in an embodiment of the multicast scheduling methodology of the present invention. In blocks 702, 704 and 706, various initialization procedures are performed with respect to commencing an MC session in an ATM environment, e.g., an access node's ATM switch fabric. Those skilled in the art will recognize that these initialization procedures may be effectuated in a number of steps having any sequential order. Accordingly, the following description relating to the initialization procedures should be deemed illustrative only. Upon receiving the root flow cells for scheduling through the node's switch fabric, a number of leaf Flow-IDs are initialized corresponding to the egress interfaces associated with the MC session (block 702). A circularly-linked MC queue (MCQ) pointer list is initialized, each linked pointer pointing to a cell memory location. Using a root flow index, the root flow cells are written into the cell memory locations, starting with the head root cell (block 704). Leaf Flow-IDs are indexed to the MCQ pointer pointing to the head root cell location in order to commence cell emission at the correct beginning of the root flow (block 706).

When a particular leaf flow becomes eligible for scheduling, a copy of the head cell contents is obtained for transmission to the egress interface associated with the winning leaf flow. The leaf flow's index pointer is updated to point to the MCQ pointer of the next cell of the MCQ (block 708). Once a particular cell is scheduled for all leaf flows (i.e., each of the egress interfaces has obtained a copy of the particular cell), the cell memory location of that cell may then be made available for writing a new root cell using the updated (i.e., current) root flow index (block 710). These operations may continue until all the root flow cells have been emitted through the fabric for each leaf flow.

Based on the foregoing discussion, it should be appreciated that the present invention provides an innovative scheme for implementing the multicasting methodology in an ATM environment, be it a switching fabric disposed in an access node or an area-wide transport network, wherein the deficiencies and shortcomings of the current implementations are advantageously overcome. By providing a single MC cell buffer that is independently accessible to a plurality of leaf flows, the need to support multiple queues is obviated. Further, such independent arrangement allows for segregated flows, thereby eliminating inter-flow interference. Further, one skilled in the art will readily recognize that although the multicast scheme of the present invention has been set forth in the context of a hierarchical scheduler operable with an access node's ATM fabric, the teachings contained herein are not limited to such context only; rather they can be practiced in other ATM applications also.

It is believed that the operation and construction of the present invention will be apparent from the foregoing Detailed Description. While the embodiments of the invention shown and described have been characterized as being exemplary, it should be readily understood that various changes and modifications could be made therein without departing from the scope of the present invention as set forth in the following claims.

What is claimed is:

1. A multicast method for directing a root flow in an Asynchronous Transfer Mode (ATM) environment to a plurality of egress interfaces using a corresponding number of leaf flows, comprising the steps:

initializing a circularly-linked pointer list, wherein a plurality of linked pointers point to a corresponding number of cell memory locations in a memory space;

upon receiving root flow cells in said ATM environment, storing said cells in said cell memory locations based on a root flow index associated with said root flow, wherein said root flow index is initialized to a particular pointer of said linked pointer list for storing a head root flow cell and is updated through said linked pointers upon arrival of additional root flow cells;

initializing a plurality of leaf flow index values, wherein each index value corresponds to a leaf flow and is initialized to said particular pointer pointing to a cell memory location containing said head root flow cell;

when a particular leaf flow becomes eligible for scheduling, obtaining a copy of said head root cell for emission to an egress interface associated with said particular leaf flow and updating its leaf flow index value to refer to a next one of said linked pointer list; and upon scheduling a particular root flow cell for each of said leaf flows, writing a new root flow cell in said particular root flow cell's memory location.

2. The multicast method for directing a root flow in an ATM environment as set forth in claim 1, wherein said operation of determining when a particular leaf flow becomes eligible for scheduling is performed by a hierarchical scheduler having a number of aggregation layers partitioned among a plurality of service priority categories.

3. The multicast method for directing a root flow in an ATM environment as set forth in claim 2, wherein one of said plurality of service priority categories is associated with a Constant Bit Rate (CBR) service class.

4. The multicast method for directing a root flow in an ATM environment as set forth in claim 2, wherein one of said plurality of service priority categories is associated with a real-time Variable Bit Rate (rt-VBR) service class.

5. The multicast method for directing a root flow in an ATM environment as set forth in claim 2, wherein one of said plurality of service priority categories is associated with a non-real-time Variable Bit Rate (nrt-VBR) service class.

6. The multicast method for directing a root flow in an ATM environment as set forth in claim 2, wherein one of said plurality of service priority categories is associated with an Unspecified Bit Rate (UBR) service class.

7. The multicast method for directing a root flow in an ATM environment as set forth in claim 2, wherein one of said plurality of service priority categories is associated with a Guaranteed Frame Rate (GFR) service class.

8. The multicast method for directing a root flow in an ATM environment as set forth in claim 1, wherein each leaf flow is specified by a Flow ID (FID).

9. The multicast method for directing a root flow in an ATM environment as set forth in claim 1, further comprising the step of adding additional number of leaf flows operable to receive said root flow.

10. The multicast method for directing a root flow in an ATM environment as set forth in claim 1, further comprising the step of deleting a number of existing leaf flows.

11. A multicast system for directing a root flow in an Asynchronous Transfer Mode (ATM) environment to a plurality of egress interfaces using a corresponding number of leaf flows, comprising:

means for initializing a circularly-linked pointer list, wherein a plurality of linked pointers point to a corresponding number of cell memory locations in a memory space;

means operable upon receiving root flow cells in said ATM environment for storing said cells in said cell memory locations based on a root flow index associated with said root flow, wherein said root flow index is initialized to a particular pointer of said linked pointer list for storing a head root flow cell and is updated through said linked pointers upon arrival of additional root flow cells;

means for initializing a plurality of leaf flow index values, wherein each index value corresponds to a leaf flow and is initialized to said particular pointer pointing to a cell memory location containing said head root flow cell;

means, operable upon determining that a particular leaf flow is eligible for scheduling, for obtaining a copy of said head root cell for emission to an egress interface associated with said particular leaf flow and for updating its leaf flow index value to refer to a next one of said linked pointer list; and means for writing a new root flow cell in a particular root flow cell's memory location upon scheduling said particular root flow cell for each of said leaf flows.

12. The multicast system for directing a root flow in an ATM environment as set forth in claim 11, further including a hierarchical scheduler having a number of aggregation layers partitioned among a plurality of service priority categories, said hierarchical scheduler operating to determine when a particular leaf flow becomes eligible for scheduling.

13. The multicast system for directing a root flow in an ATM environment as set forth in claim 12, wherein one of said plurality of service priority categories is associated with a Constant Bit Rate (CBR) service class.

14. The multicast system for directing a root flow in an ATM environment as set forth in claim 12, wherein one of said plurality of service priority categories is associated with a real-time Variable Bit Rate (rt-VBR) service class.

15. The multicast system for directing a root flow in an ATM environment as set forth in claim 12, wherein one of said plurality of service priority categories is associated with a non-real-time Variable Bit Rate (nrt-VBR) service class.

16. The multicast system for directing a root flow in an ATM environment as set forth in claim 12, wherein one of said plurality of service priority categories is associated with an Unspecified Bit Rate (UBR) service class.

17. The multicast system for directing a root flow in an ATM environment as set forth in claim 12, wherein one of said plurality of service priority categories is associated with a Guaranteed Frame Rate (GFR) service class.

18. The multicast system for directing a root flow in an ATM environment as set forth in claim 11, wherein each leaf flow is specified by a Flow ID (FID).

19. The multicast system for directing a root flow in an ATM environment as set forth in claim 11, further comprising means for adding additional number of leaf flows operable to receive said root flow.

20. The multicast system for directing a root flow in an ATM environment as set forth in claim 11, further comprising means for deleting a number of existing leaf flows.

21. A buffer system for implementing a multicast scheduling technique in an Asynchronous Transfer Mode (ATM) environment, wherein a root flow is transmitted to a plurality of egress interfaces using a corresponding number of leaf flows, comprising:
   an index memory structure operable to contain a plurality of leaf flow index values associated with said leaf flows and a root flow index associated with said root flow;
   a pointer memory structure operable to contain a plurality of circularly-linked pointers, wherein said leaf flow index values and said root flow index are indexed to said linked pointers; and
   a cell memory structure having a plurality of cell memory locations to which said linked pointers point, wherein root flow cells received in said ATM environment are stored in said cell memory locations based on said root flow index and, when a particular leaf flow becomes eligible for scheduling, a copy of a root cell is obtained for emission, said root cell being located in a cell memory location that is pointed to by a linked pointer to which said particular leaf flow's index value is indexed, wherein a hierarchical scheduler having a number of aggregation layers partitioned among a plurality of service priority categories is provided for determining when said particular leaf flow becomes eligible for scheduling.

22. The buffer system for implementing a multicast scheduling technique in an ATM environment as set forth in claim 21, wherein one of said plurality of service priority categories is associated with a Constant Bit Rate (CBR) service class.

23. The buffer system for implementing a multicast scheduling technique in an ATM environment as set forth in claim 21, wherein one of said plurality of service priority categories is associated with a real-time Variable Bit Rate (rt-VBR) service class.

24. The buffer system for implementing a multicast scheduling technique in an ATM environment as set forth in claim 21, wherein one of said plurality of service priority categories is associated with a non-real-time Variable Bit Rate (nrt-VBR) service class.

25. The buffer system for implementing a multicast scheduling technique in an ATM environment as set forth in claim 21, wherein one of said plurality of service priority categories is associated with an Unspecified Bit Rate (UBR) service class.

26. The buffer system for implementing a multicast scheduling technique in an ATM environment as set forth in claim 21, wherein one of said plurality of service priority categories is associated with a Guaranteed Frame Rate (GFR) service class.

27. The buffer system for implementing a multicast scheduling technique in an ATM environment as set forth in claim 21, wherein each leaf flow is specified by a Flow ID (FID).

\* \* \* \* \*